US009203530B2

(12) United States Patent
Gunnarsson et al.

(10) Patent No.: US 9,203,530 B2
(45) Date of Patent: Dec. 1, 2015

(54) METHOD AND APPARATUS FOR DETERMINING STATISTICS FOR DIRECTION OF DEPARTURE (75) Inventors: Fredrik Gunnarsson, Linköping (SE); Niklas Carlsson, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 50 days.

(21) Appl. No.: 14/350,381

(22) PCT Filed: Oct. 13, 2011

(86) PCT No.: PCT/SE2011/051226
§ 371 (c)(1),
(2), (4) Date: Apr. 8, 2014

(87) PCT Pub. No.: WO2013/055269
PCT Pub. Date: Apr. 18, 2013

(65) Prior Publication Data
US 2014/0287692 A1 Sep. 25, 2014

(51) Int. Cl.
*H04B 17/00* (2015.01)
*H04W 24/10* (2009.01)
*H04B 17/318* (2015.01)
*H04B 7/06* (2006.01)
(Continued)

(52) U.S. Cl.
CPC .......... *H04B 17/0057* (2013.01); *H04B 7/0617* (2013.01); *H04B 7/0619* (2013.01); *H04B 17/318* (2015.01); *H04W 24/10* (2013.01); *H04B 17/26* (2015.01); *H04B 17/27* (2015.01); *H04B 17/373* (2015.01)

(58) Field of Classification Search
CPC ... H04W 24/00; H04B 17/0042; H04B 17/00; H04B 17/0057
USPC ........................................... 455/67.11, 115.3
See application file for complete search history.

(56) References Cited

U.S. PATENT DOCUMENTS 7,206,608 B1 4/2007 Wu et al.
7,660,591 B1 2/2010 Krishnakumar et al.
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.2.0, Sep. 2007, 1-109.
(Continued)

*Primary Examiner* — April G Gonzales
(74) *Attorney, Agent, or Firm* — Patent Portfolio Builders, PLLC (57) ABSTRACT

A method (200) for determining statistics for the Direction of Departure between a UE and a base station. The method (200) comprises receiving measurement reports from the UE on the strength of signals in the UE from one or more of the cells served by the base station, and for one pair of cells served by the base station, determining (220) whether or not the UE was limited in measuring the strength of the signals, and, if the UE was limited, determining (230) said statistics using the signal strengths from the cells in the pair, the cells' antenna gain towards the UE and the maximum difference between the signal strengths from the cells in the pair, and if the UE was not limited, determining (225) said statistics using the signal strengths from the cells in the pair and differences in the cells' antenna gain towards the UE.

21 Claims, 8 Drawing Sheets (51) Int. Cl.
    *H04B 17/26*    (2015.01)
    *H04B 17/27*    (2015.01)
    *H04B 17/373*   (2015.01)

(56) References Cited

U.S. PATENT DOCUMENTS

| | | | | |
|---|---|---|---|---|
| 8,385,836 | B2* | 2/2013 | Whinnett | 455/67.11 |
| 8,385,961 | B1* | 2/2013 | Christensen et al. | 455/513 |
| 8,862,076 | B2* | 10/2014 | Whinnett | 455/115.1 |
| 8,903,325 | B2* | 12/2014 | Yin | 455/67.11 |
| 2002/0082767 | A1* | 6/2002 | Mintz | 701/117 |
| 2009/0033555 | A1 | 2/2009 | Niu et al. | |
| 2010/0201598 | A1* | 8/2010 | Lau et al. | 343/861 |
| 2011/0013711 | A1 | 1/2011 | Wang et al. | |
| 2011/0064152 | A1 | 3/2011 | Okino | |
| 2011/0249588 | A1* | 10/2011 | Petersson et al. | 370/252 |
| 2015/0181481 | A1* | 6/2015 | Masini et al. | 455/436 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 9)", 3GPP TS 36.331 V9.2.0, Mar. 2010, 1-248.

3GPP, "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 9)", 3GPP TS 36.305 V9.2.0, Mar. 2010, 1-52.

3GPP, "3rd Generation Partnership Project; Technical Specification Group Radio Access Network; Physical layer—Measurements (Release x)", 3GPP TS 36.214 V0.0.0, Oct. 2006, 1-7.

3GPP, "3rd Generation Partnership Project; Technical Specification Group Radio Access Network; Physical layer procedures (Release 8)", 3GPP TS 36.213 V0.1.0, Oct. 2006, 1-11.

3GPP, "3rd Generation Partnership Project; Technical Specification Group Radio Access Network; Study on Minimization of drive-tests in Next Generation Networks; (Release 9)", 3GPP TR 36.805 V9.0.0, Dec. 2009, 1-24.

Unknown, Author, "Information Sought on Methods for Verifying Compliance With E911 Accuracy Standards", Federal Communications Commission, DA 99/2130, Washington, D.C., USA, Oct. 8, 1999, 1-4.

Unknown, Author, "Informative List of SON Use Cases", NGMN Project 12, Annex A (informative) of "Use Cases related to Self Organising Networks. Overall Description.", Document for: Detailed Description of uses cases for Self Organizing Functionality in 2G/3G/LTE RAN and Core Net, Apr. 17, 2007, 1-36.

* cited by examiner

METHOD AND APPARATUS FOR DETERMINING STATISTICS FOR DIRECTION OF DEPARTURE

TECHNICAL FIELD

The present invention discloses a method and a device for determining statistics for the Direction of Departure in a cellular system.

BACKGROUND

Wireless network operators today invest considerable amounts of manual effort in planning, configuring, optimizing, and maintaining their cellular systems. Such efforts can consume a great part of the operators' "OPEX", i.e. their operational expenditures.

Thus, an important wish from the operators' side is a reduction of the manual effort need for the deployment, configuration, and optimization phases of their cellular systems, both for existing systems and future systems. Such a reduction can be obtained by means of automation of the tasks typically involved in planning and operating a system.

A viable method for such automation is to use the user equipments, UEs, in the system to measure and report a number of system parameters. In such a context, it becomes important to have a reliable method for determining a UE's location. Determining the angle between a UE and a base station, usually the base station of the UE's serving cell, is important in this context, the angle in question sometimes being referred to as Angle of Arrival (as seen from the UE) or Angle/Direction of Departure (as seen from the base station).

There are Direction of Departure estimation methods known in the prior art. For example, if accurately synchronized in time, signals received from several antennas or antenna elements at a base station can be correlated to determine the Direction of Departure. Known methods for this include subspace methods, which have a numerical efficiency. Such methods are also possible to use based on less accurate measurement, for example in relation to less accurately time aligned antenna elements or less detailed measurements such as power measurements. It is also known in the art that there is a relation between antenna gains to multiple antenna elements and the received power level at a mobile terminal. Antenna information and mobile terminal power measurements can thus lead to angle of arrival estimates, either one unique or multiple ambiguous candidate angles.

The methods mentioned for determining the Direction of Departure may work well in theory, but "real life" UEs do not present bias-free measurements. For example, a UE will often have difficulties in accurately measuring a weak signal in the presence of a very strong signal, which leads to inaccurate signal strength difference estimates, and possibly also a situation in which the weaker signal is not detected at all by the UE.

The accuracy of methods used for determining the Direction of Departure between a UE and a base station may also be improved upon if statistics for the Direction of Departure can be arrived at in an accurate manner.

SUMMARY

It is an object of the present invention to obtain a method for determining statistics for the Direction of Departure in an accurate manner.

This object is obtained by means of a method for determining statistics for the Direction of Departure between a User Equipment, a UE, in a cellular system and a site for a base station which serves two or more cells in the cellular system and which is equipped with at least one antenna per served cell.

The method comprises receiving in the base station measurement reports from the UE which include the strength of signals received in the UE from one or more of the cells which are served by the base station, and for at least one pair of cells served by the base station:

Determining whether or not the UE was limited with respect to its measurements of the strength of the signals from one of the cells in the pair,
   If the UE was limited, determining said statistics using the signal strengths from the cells in the pair, the cells' antenna gain towards the UE and the maximum difference between the signal strengths from the cells in the pair,
   If the UE was not limited, determining said statistics using the signal strengths from the cells in the pair and differences in the cells' antenna gain towards the UE.

By means of using the cells "pair-wise" and by also taking into account the fact that the UE may have been limited in its measurements of the signals from one of the cells, a more representative Direction of Departure statistics can be determined than previously.

In embodiments of the method, the determining of Direction of Departure statistics comprises one or more of the following:

If the UE was not limited, determining one or more candidates for the Direction of Departure and a probability distribution function for the one or more candidates,
   If the UE was not limited, determining one or more candidates for the Direction of Departure and a measure of the estimation accuracy for the one or more candidates, the measure being an estimation error variance or standard deviation,
   If the UE was limited, determining a range within which the Direction of Departure is located,
   If the UE was limited or not, associating all of said one or more candidates for the Direction of Departure with a minimum probability.

In embodiments of the method, the UE is determined to be limited if the difference between the signal strengths from the cells in the pair exceeds a first threshold.

In embodiments of the method, the UE is determined to be limited if the difference between the signal strengths from the cells in the pair exceeds a second threshold which is larger than the first threshold.

In embodiments of the method, the reliability of the UE's measurement reports is evaluated, and measurement reports which are determined to be unreliable are discarded, and the determining of whether or not the UE was limited as well as the determining of said statistics is only carried out for reliable measurement reports.

In embodiments of the method, the first threshold is used, and the maximum received signal difference for a UE which was limited is seen as the difference between the strongest signal in the cell pair and said first threshold.

In embodiments of the method, the second threshold is used, and the maximum received signal difference for a UE which was limited is seen as the strongest signal in the cell pair.

In embodiments of the method, both the first and the second thresholds are used, and the maximum received signal difference for a UE which was limited is seen as the difference between the strongest signal in the pair and the first threshold if the difference exceeds the first but not the second threshold.

The invention also discloses a network node for a cellular communications system. The network node is arranged to receive measurement reports from a User Equipment, a UE, in the cellular communications system, the measurement reports comprising the strength of signals received by the UE from one or more cells served by the same base station.

The network node is provided with antenna gain information for said cells and also with information on the UE's limitations on measuring said signal strength, and the network node is arranged to, for at least one pair of cells served by the base station:
  Determine whether or not the UE was limited with respect to its measurements of the strength of the signals from one of the cells in the pair,
  If the UE was limited, determine statistics for the Direction of Departure between the UE and the base station using the signal strengths from the cells in the pair, the cells' antenna gain towards the UE and the maximum difference between the signal strengths from the cells in the pair,
  If the UE was not limited, determining statistics for the Direction of Departure between the UE and the base station using the signal strengths from the cells in the pair and said differences in the cells' antenna gain towards the UE.

In embodiments, the network node is arranged to determine the statistics for the Direction of Departure by means of one or more of the following:
  If the UE was not limited, determine one or more candidates for the Direction of Departure and a probability distribution function for said one or more candidates,
  If the UE was not limited, determine one or more candidates for the Direction of Departure and a measures of the estimation accuracy for said one or more candidates, said measure being an estimation error variance or standard deviation,
  If the UE was limited, determine a range within which the Direction of Departure is located,
  If the UE was limited or not, associate all of said one or more candidates for the Direction of Departure with a minimum probability.

In embodiments, the network node is arranged to determine that the UE was limited if the difference between the signal strengths from the cells in the pair exceeds a first threshold.

In embodiments, the network node is arranged to determine that the UE was limited if the difference between the signal strengths from the cells in the pair exceeds a second threshold which is larger than the first threshold.

In embodiments, the network node is arranged to evaluate the reliability of the UE's measurement reports and to discard measurement reports which are determined to be unreliable and to only use reliable measurement reports when determining said statistics. In some such embodiments, the network node is arranged to use a quality indicator which is comprised in the measurement reports, and to consider a measurement report unreliable if its quality indicator is below a pre-determined threshold. In some such embodiments, the network node is arranged to consider a measurement report unreliable if the measurement report is from a cell other than the UE's serving cell and the serving cell's RSRQ, Reference Signal Received Quality, exceeds a pre-determined threshold.

In embodiments, the network node is arranged to use the first threshold, and to use the difference between the strongest signal in the cell pair and the first threshold as the maximum received signal difference for a UE which was limited.

In embodiments, the network node is arranged to use the second threshold, and to use the strongest signal in the pair as the maximum received signal difference for a UE which was limited.

In embodiments, the network node is arranged to use both the first and the second thresholds, and to use as the maximum received signal difference, for a UE which was limited, the difference between the strongest signal in the cell pair and the first threshold if the difference exceeds the first but not the second threshold, and the strongest signal in the cell pair if the difference exceeds the second threshold.

In embodiments, the network node is a base station for two or more cells in the cellular communications system, equipped with at least one antenna per cell, In such embodiments, the network node is arranged to receive the measurement reports straight from the UE.

The term "base station" is here used as a generic term for a node which has different names in different cellular communications systems, and which is the node that is the "nearest" to the User Equipment in the system; for example, in GERAN systems the node here referred to as a base station node is known as a Base Transceiver Station, BTS, in UTRAN systems it is known as a NodeB and in E-UTRAN systems (LTE) it is known as an eNodeB.

However, the network node need not be a base station. In embodiments, the network node is a core network node or a radio access network node or an Operations and Maintenance (OaM) system node. An example of an OaM system node is a Trace Collection Entity gathering mobile station trajectory data. The network node is in such embodiments arranged to receive the UE's measurement reports via at least one other node in the cellular communication system. Further examples of the network node include:
  a radio network controller,
  a base station controller,
  a Serving Mobile Location Center.
  an Evolved Serving Mobile Location Center.

BRIEF DESCRIPTION OF THE DRAWINGS

The invention will be described in more detail in the following, with reference to the appended drawings, in which.

DETAILED DESCRIPTION

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout. The terminology used herein is for the purpose of describing particular embodiments only, and is not intended to limit the invention.

The invention will be described below with terminology from the LTE system, which should however be seen as only as an example of a cellular communications system. Examples of other kinds of cellular communications systems in which the invention can be applied include GSM systems, WCDMA systems and 3G systems.

Figure 1:
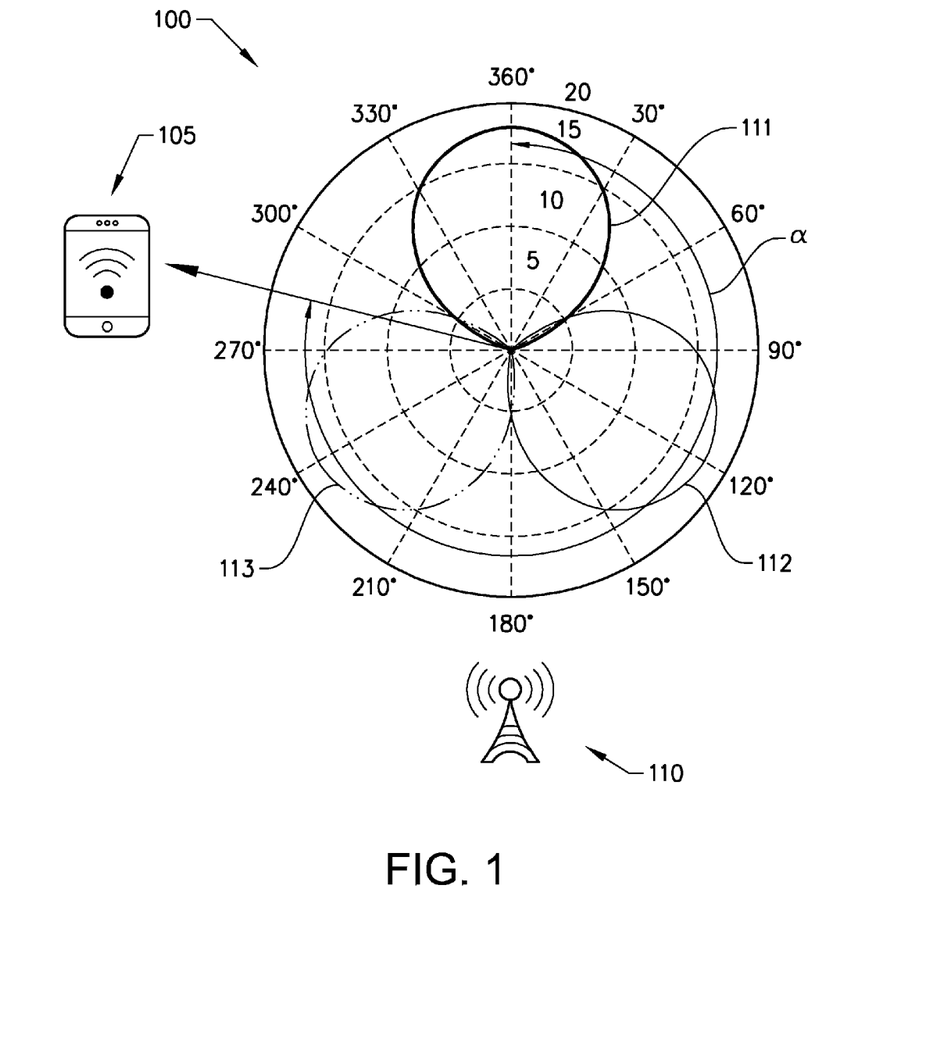
FIG. 1 shows a top view of a cellular system.

FIG. 1 shows a "top view" of a part of an LTE system 100. The LTE system 100 comprises an eNodeB 105 and can accommodate a number of UEs, one of which is shown and indicated as 110. The eNodeB 105 serves three different cells, shown as 111, 112 and 113 in FIG. 1, and is equipped with one or more antenna for each cell. Also shown in FIG. 1 is the Direction of Departure, shown as an angle α between the eNodeB 105 and the UE 110, i.e. the angle for which it is sought to determine statistics by means of the invention.

The UE 110 will receive signals from one or more of the cells 111, 112 and 113, although in most cases the signals will be received with differing signal strengths.

Figure 2:
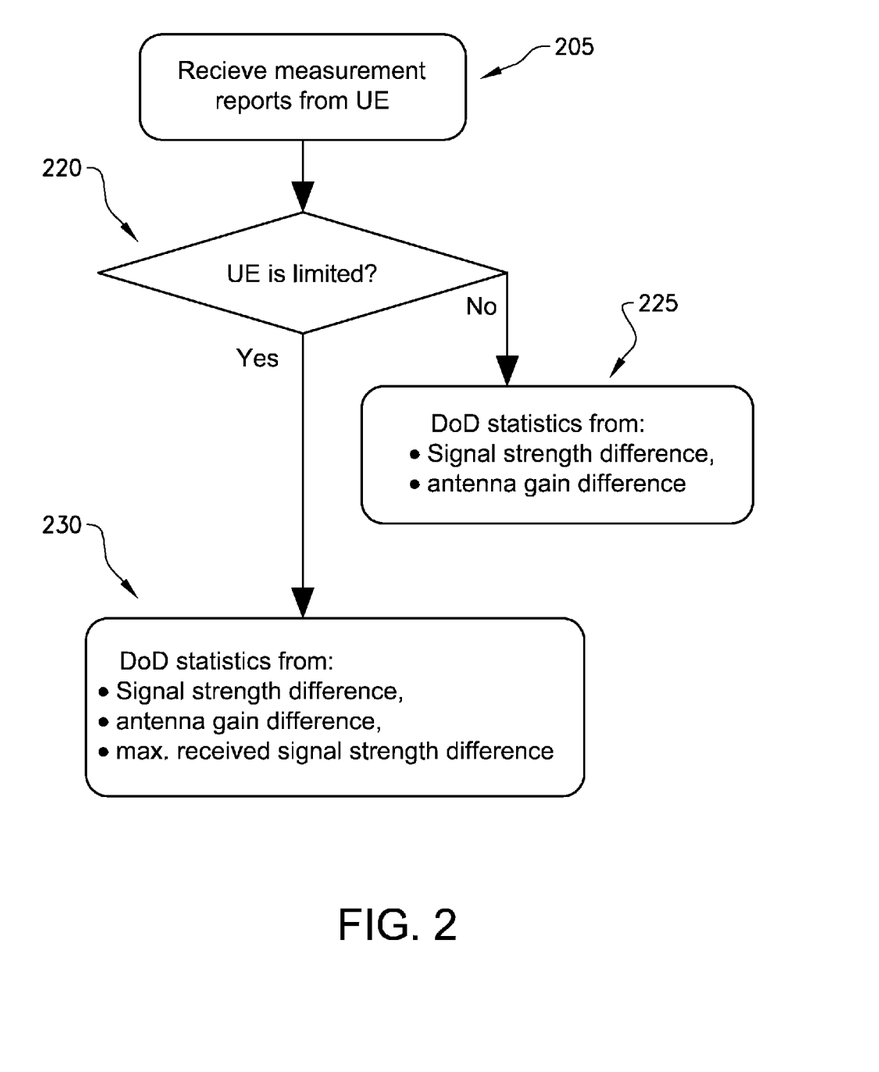
FIG. 2 shows a flow chart of a method.

FIG. 2 shows a schematic flowchart of a method 200 of the invention. The steps indicated in the flowchart will first be described briefly below, following which more detailed examples of each step will be given.

As explained previously, the invention aims at determining statistics for the Direction of Departure, i.e. for the angle α in FIG. 1, between an UE in a cellular system and an eNodeB (also sometimes generically referred to as a "base station") which serves two or more cells in the cellular system and which is equipped with at least one antenna per served cell. The invention is suitably carried out in an eNodeB, suitably the serving eNodeB of the UE in question, e.g. in the system 100 of FIG. 1, the eNodeB 105 for the UE 110, although it can also be carried out in other nodes in the cellular system.

As indicated, the method 200 comprises the step 205 of receiving measurement reports from the UE in question. These measurement reports include the strength of the signals received by the UE from two or more of the cells which are served by the eNodeB. In other embodiments, the measurement reports include other parameters, such as, for example, signal quality parameters.

As indicated in step 220, another step in the method 200 is to see if the UE was limited in measuring the signal strengths from the different cells which are served by the eNodeB. For example, if the difference between the signals from two cells is greater than a certain threshold, the stronger signal may "mask" the weaker signal. Thus, in step 220, it is checked if there are such limitations on the UE.

Depending on the outcome of the check in step 220, i.e. if the UE was limited or not in its measurements, statistics for the Direction of Departure between the UE and the NodeB is determined in one of two manners, where the "no" case, i.e. the case with an UE which is not limited is shown in step 225, and the "yes" case, i.e. a limited UE is shown in step 230.

Both cases, i.e. limited/non-limited UE, use the signals from the cells in a pair-wise manner, e.g. if cells A, B and C are served by the eNodeB, the difference in signal strengths as reported by the UE between the signals from at least one of the cell pairs A-B, A-C and B-C is/are used. Both cases also use the differences between the cell's antenna gain towards the UE used, e.g. for cell pair A-B, the difference between cell A's antenna gain towards the UE and cell B's antenna gain is used to determine the statistics for the Direction of Departure i.e. for the angle α in FIG. 1.

In addition, the "yes" case, i.e. where the UE was limited in its measurements of signal strengths from the cells, also uses the maximum difference between the received signal strengths from the two cells in said pairs in order to determine the statistics for the Direction of Departure i.e. the angle α in FIG. 1.

Below, the steps described briefly above in connect with the flow chart of FIG. 2 will be described in greater detail.

Receive Measurement Reports from the UE, Step 205

As mentioned previously, it is the signal strength from different cells at the UE which is used in the method 200 and which is comprised in measurement reports from the UE, step 205. The measurement reports are made by the UE to the eNodeB, from where they may be transmitted to one or more of the other nodes in the system for processing, i.e. for determining the statistics for the Direction of Departure, as an alternative to which they are processed directly in the eNodeB.

A UE in an LTE system is arranged to report a number of parameters to its serving eNodeB. A number of different parameters which are reported by the UE to the eNodeB can be used as measurements of signal strength, either separately or together. The two main parameters which can be used as measurements of signal strength are the RSRP (Reference Symbol Received Power), and the RSRQ (Reference Symbol Received Quality).

The definitions of these parameters are as follows:

RSRP is determined by the UE for a cell as the linear average over the received power contributions (in [W]) of the symbols that carry cell-specific reference signals within the considered measurement frequency bandwidth.

RSRQ is defined as the ratio of NxRSRP/(E-UTRA carrier RSSI), where N is the number of Resource Blocks of the E-UTRA carrier RSSI (Received Signal Strength Indicator) measurement bandwidth. The measurements in the numerator and the denominator are made over the same set of resource blocks.

As will be explained below, in some embodiments of the invention, the reliability of the received measurement reports is evaluated, and in such embodiments, a parameter which can be used is the so called CQI (Channel Quality Indicator) of the received signal from each cell, which may be included in the measurement reports from the UE.

The RSRP and RSRQ measurements are reported via RRC (Radio resource Control), while the CQI is reported via UE feedback reports, typically via MAC (Mobility Access Control). Thus, the term "measurement reports" as used herein refers to both RRC and MAC reports.

Determining if the UE is Limited in its Measurements, Step 220

As mentioned previously, the invention uses signals from the cells pair-wise in order to determine statistics for the Direction of Departure. As indicated in step 220, the statistics for the Direction of Departure are determined differently using such pairs depending on whether or not the UE was limited in its measurements of the signal strengths from the cells in the pair. The term "limited" is here used in the sense that the UE is only assumed to be capable of measuring signal strengths which differ from each other by less than a certain amount, so that if the reported signal strengths differ from each other more than this amount, the difference in reported signal strengths from the UE is assumed to be inaccurate, and is handled accordingly, as will be described below.

Figure 3A:
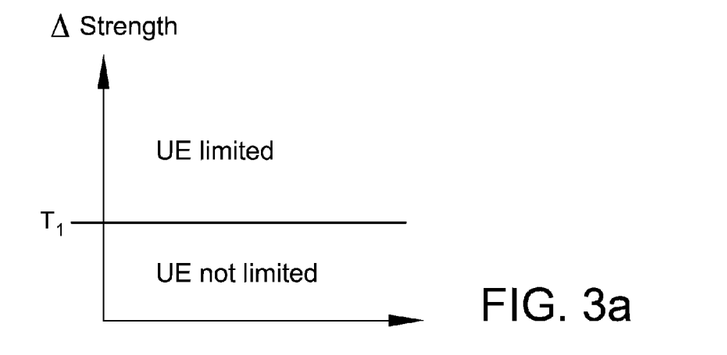
FIG. 3 shows the use of thresholds.

In order to ascertain if the UE was limited or not when making its measurements of the signal strengths from the cells in the pair, different principles can be used, all of which involve comparing the differences in reported signal strengths in the cell pair to one or more thresholds. Examples of this comprise:

The UE is determined to be limited if the difference between the signal strengths from the cells in the pair exceeds a first threshold. This is shown in FIG. 3a, which shows the difference in signal strength as Δstrength and the first threshold as $T_1$. If the UE is determined to be limited in this manner, in embodiments, the UE is assumed to report the weaker signal strength at a level which is the level of the strongest signal minus the first threshold, $T_1$. Thus, if the stronger signal is denoted as $S_{strong}$ and the weaker signal is denoted as $S_{weak}$, the expression of Δstrength for a limited UE can be written as Δstrength=$S_{strong}$−$T_1$.

Figure 3B:
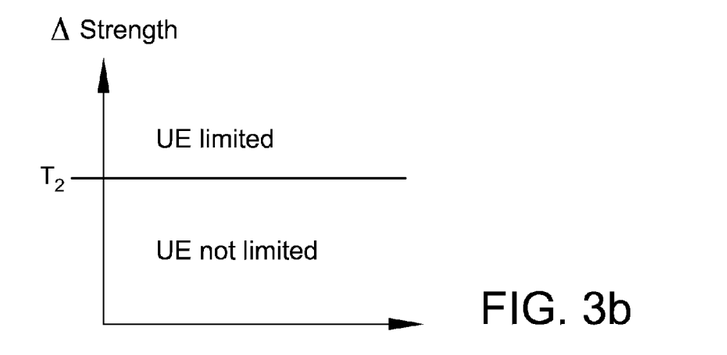
Figure 3C:
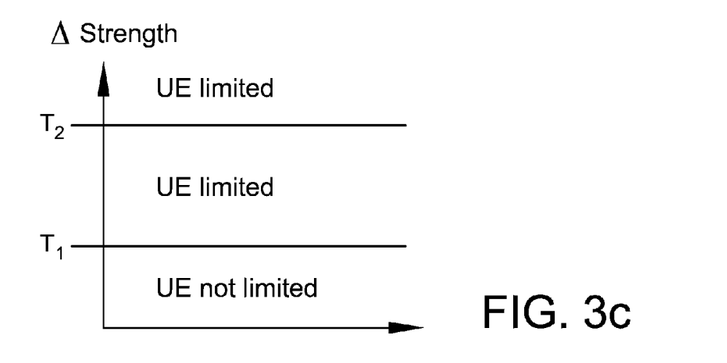

The UE is determined to be limited if the difference between the signal strengths from the cells in the pair exceeds a second threshold which is larger than the first threshold. This is shown in FIG. 3b, which also shows the difference in signal strength as Δstrength and the second threshold as $T_2$. If the UE is determined to be limited in this manner, in embodiments, the UE is assumed to not report the weaker signal at all.

If the UE only reports measurements from one cell, then the UE may also be determined to be limited. However, the conclusion that, the UE is limited when only one cell is reported may be erroneous, since this can also occur if, for example, one cell at a base station has operational problems and cannot be detected by the UE. One precaution against such cases would be to only determine that the UE is limited when only one cell is reported if some or all of the other cells served by the same base station have been reported in other parts of the UE trace, or by another UE, which would ensure that those other cells are operational.

Determining Statistics for the Direction of Departure for Unlimited UEs, Step 225

Figure 4:
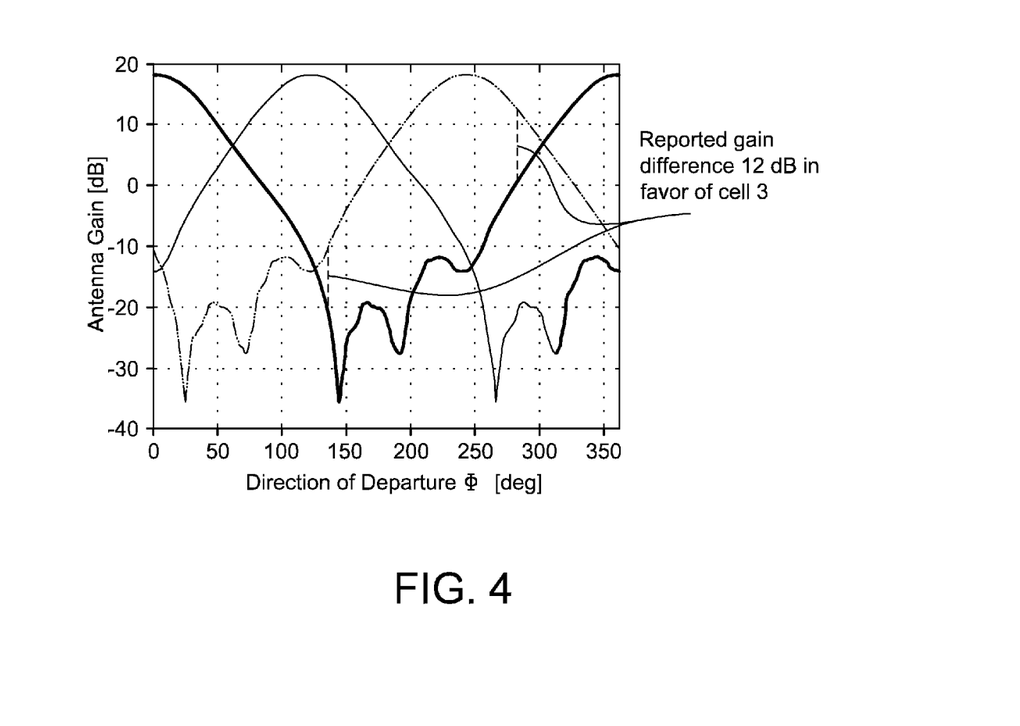
FIGS. 4 and 5 show antenna gain and candidate angles.

If a UE is determined to be unlimited in its measurements of signals from the various cells served by one and the same base station, statistics for the Direction of Departure can be determined in the following manner: the difference between reported signal strengths from two cells at a time, i.e. "pairwise", is mapped to one or more candidate for the angle α, using knowledge of the base station's antenna gain as a function of horizontal angle (i.e. the "antenna diagram") for the two cells involved. All combinations of (horizontal) angles in the antenna diagrams which give the difference between reported signal strengths are designated as candidates for the angle α. Examples of this are shown in FIGS. 4 and 5:

If we let the pair of cells which is being dealt with at present be cells 1 and 3 in FIG. 2, and let the difference between the reported signal in strengths from the UE be 12 dB in favor of cell 3, then there are two angles which will give this gain difference, both of which angles are indicated in FIG. 4, which shows antenna gain for each of the cells 1-3 as a function of the angle for the Direction of Departure for cells. As can be seen, one candidate angle is approximately 130° and the other one is approximately 270°.

Figure 5:
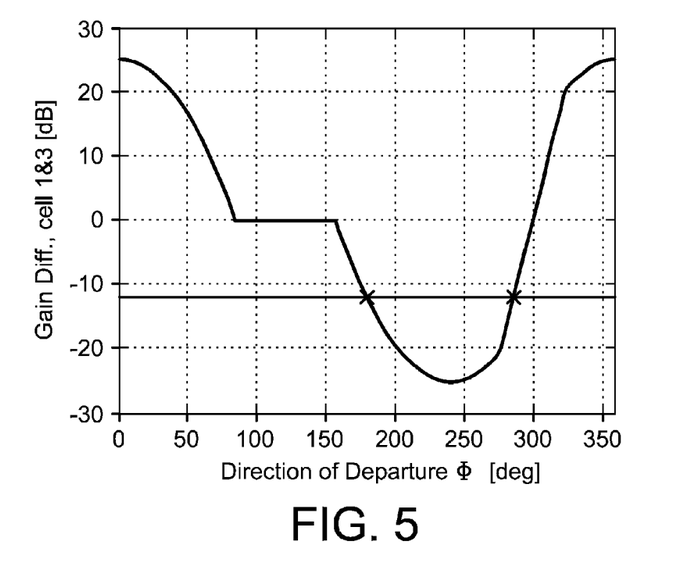

This is shown in a slightly different manner in FIG. 5, which shows differences in antenna gain between cells 1 and 3 as a function of the Direction of Departure. Again, we see the two (horizontal) angles which correspond to a signal strength difference of 12 dB in favor of cell 3, i.e. one candidate angle at approximately 130° and the other one at approximately 270°.

In addition to knowing (measured, modeled or taken from data sheets) the antenna diagrams of the cells involved, another factor which may be taken into account when determining candidate angles is the difference in losses where the antennas are connected to the base station. This may be seen as corrections to the diagrams of FIGS. 4 and 5.

We now have a number of candidates for the angle α, and wish to determine the probability distribution function for those candidates. One example of how this is done is to first determine the estimation error standard deviation for the candidates shown in FIGS. 4 and 5, which can be done by using the Fisher information, which is a way of measuring the amount of information that an observable random variable S carries about an unknown parameter φ upon which the probability of S depends. Let h(φ) denote the antenna gain difference, and assume that this difference is measured subject to zero-mean Gaussian noise w of variance $2\sigma^2_{RSS}$. This means:

$$S = h(\phi) + w \quad (1)$$

Denote the probability function of S as f(S;φ). Given φ, we thus have:

$$f(S;\phi) = N(h(\phi), 2\sigma^2_{RSS}). \quad (2)$$

The Fisher Information Matrix in this single parameter case with Gaussian noise is determined by:

$$I = E\left[\left(\frac{\partial}{\partial \phi} \ln f(S;\phi)\right)^2 \Big| \phi\right] = \frac{1}{2\sigma^2_{RSS}} \left(\frac{dh(\phi)}{d\phi}\right)^2 \quad (3)$$

For an unbiased direction of departure estimator, the estimation error variance is bounded by the Cramer-Rao Lower Bound. From the Cramer-Rao lower bound, it can be concluded that the variance of an unbiased estimate $\hat{\phi}$ is bounded by $$\text{Var}\{\hat{\phi}\} \geq \frac{2\sigma^2_{RSS}}{\left(\frac{dh(\phi)}{d\phi}\right)^2} \quad (4)$$

Hence, the estimation error standard deviation of an unbiased angle estimator is bounded by $$\text{StdDev}\{\hat{\phi}\} \geq \frac{\sqrt{2}\,\sigma_{RSS}}{\left|\frac{dh(\phi)}{d\phi}\right|} \quad (5)$$

Furthermore, assume that it is reasonable to approximate the resulting estimation error standard deviation $\hat{\sigma}_\phi$ as a function of the bound above, for example as a linear function:

$$\hat{\sigma}_\phi = \text{StdDev}\{\hat{\phi}\} \approx \delta_s \frac{\sqrt{2}\,\sigma_{RSS}}{\left|\frac{dh(\phi)}{d\phi}\right|} + \varepsilon_s \quad (6)$$

Figure 6:
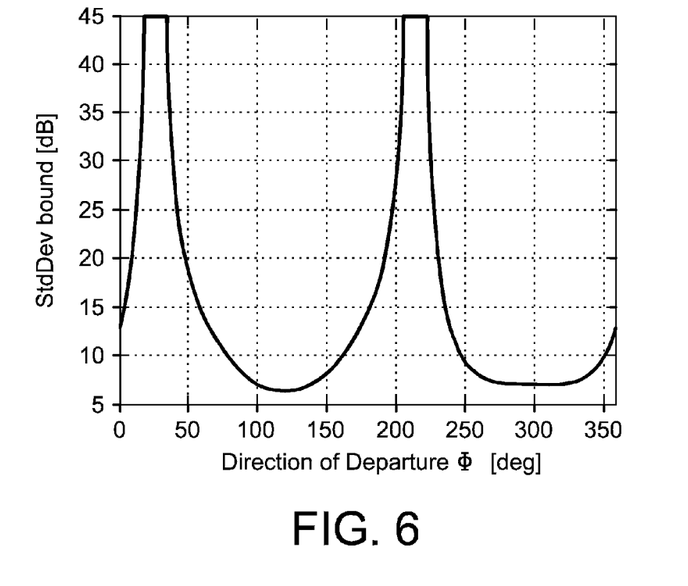
FIGS. 6 and 7 show a standard deviation for the candidate angles of FIG. 5.
Figure 7:
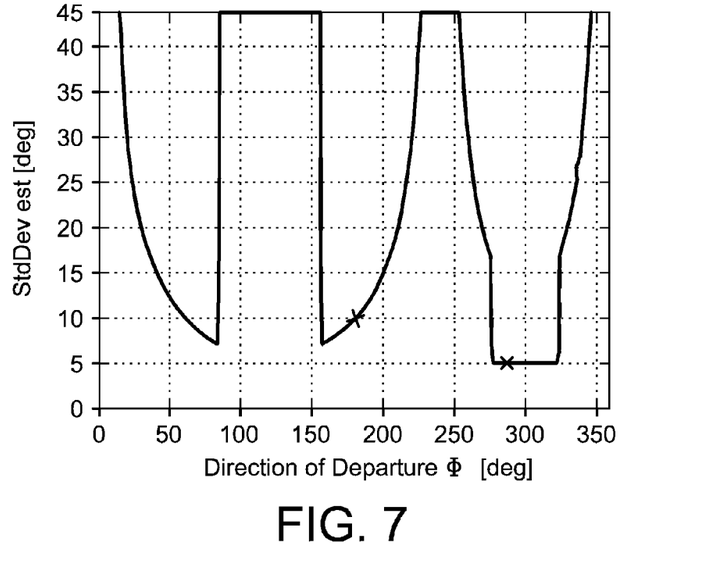

This error standard deviation approximation is illustrated in FIGS. 6 and 7 for δ=1 and ε=0, with the values corresponding to the direction of departures shown in FIGS. 4 and 5 being shown in FIG. 7.

The antenna information which is used may be represented in different manners, for example by fitting a model to the measured antenna gain, or by the use of a model parameterized in data sheet parameters. Examples of both will be given below.

FIG. 6 shows an estimation error standard deviation estimate based on Cramér-Rao lower bound for an unbiased direction of departure estimator considering the cell pair 111 and 112 of FIG. 1, assuming an RSRP measurement error standard deviation of 3 dB and an antenna model fitted to measured antenna data is used.

FIG. 7 shows a estimation error standard deviation estimate based on the Cramér-Rao lower bound for an unbiased direction of departure estimator considering the cell pair 111 and 112, assuming a RSRP measurement error standard deviation of 3 dB and an antenna model using data sheets parameters.

Alternatively, it is possible to approximate the resulting estimation error variance $\hat{\sigma}^2_\phi$ as a function of the variance bound from the Cramér-Rao Lower Bound for example a linear function $$\hat{\sigma}^2_\phi = \text{Var}\{\hat{\phi}\} \approx \delta_v \frac{2\sigma^2_{RSS}}{\left(\frac{dh(\phi)}{d\phi}\right)^2} + \varepsilon_v \tag{7}$$

Hence for a set of estimated direction of departure candidates $\hat{\phi}_1, \hat{\phi}_2, \ldots$ and associated estimation error variance approximations $\hat{\sigma}^2_{\phi 1}, \hat{\sigma}^2_{\phi 2}, \ldots$ the direction of departure candidate distribution estimate is obtained as $$\Delta\phi_i = \min\{|\phi - \hat{\phi}_i|, |\phi - \hat{\phi}_i - 360|\} \tag{8}$$

$$p\hat{d}f = C\left(\sum_i \frac{1}{\hat{\sigma}_{\phi i}\sqrt{2\pi}} e^{-(\Delta\phi_i)^2/2/\hat{\sigma}_{\phi i}} + \varepsilon\right) \tag{9}$$

where C is a normalization constant.

Figure 8:
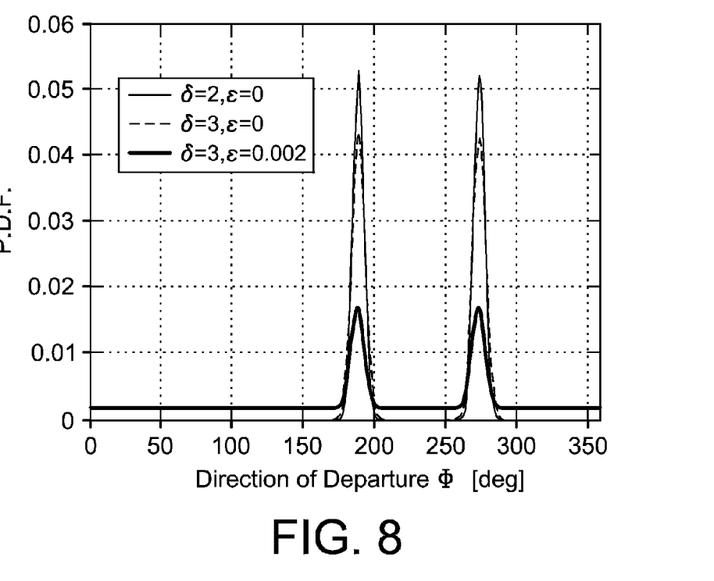
FIG. 8 shows a probability distribution for the candidate angles of FIG. 5.

Thus, as shown above and in FIGS. 6 and 7, we now have an estimation error standard deviation estimate for the candidates for the angle α, and we also have candidates for that angle, as shown in FIGS. 4 and 5. If we apply the estimation error standard deviation shown in FIG. 7 to the candidate angles, we obtain a graph of a probability distribution function (P.D.F.) which is shown in FIG. 8, where the estimation error standard deviation from FIG. 7 is applied, using δ=2, ε=0; δ=3, ε=0 and δ=3, ε=0.002. The $\epsilon_s$ and $\epsilon_v$ are all 0 in the example.

Determining Candidate Angles for Limited UES, Step 230

For a UE which is limited in measuring differences between signal strengths from different cells, one observation that can be made is that a UE with such a maximum received signal strength difference will report signal strength measurements which differ by an amount which is less than or equal to the maximum perceived signal strength difference, even though the actual difference is larger.

Figure 9:
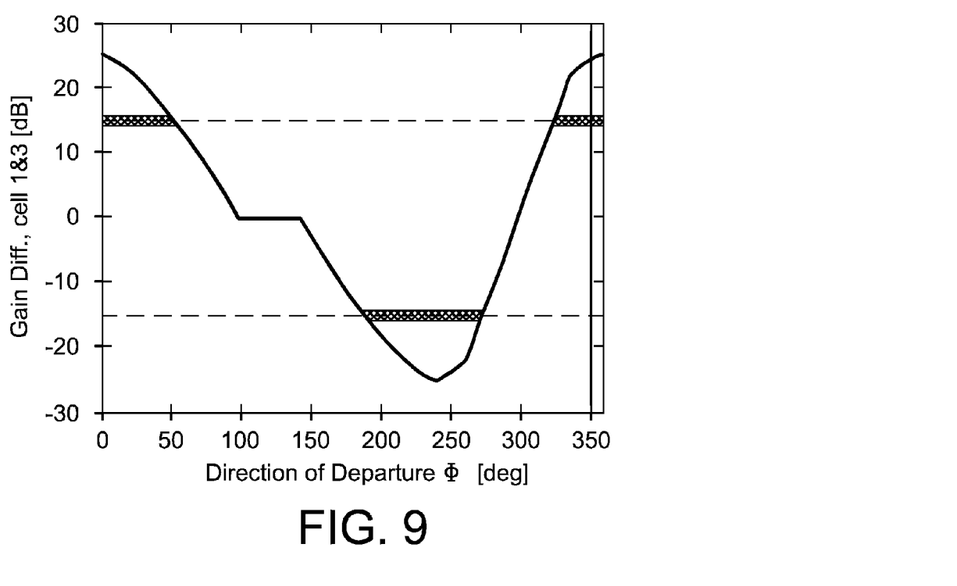
FIG. 9 shows bands of antenna gain and candidate angles.

This erroneous reporting can be predicted by analyzing the antenna gain differences (i.e. differences in the antenna diagrams, as discussed above, possibly also including connection losses), in the manner which is shown in FIG. 9 which shows differences in gain between cells 1 and 3 with a UE limitation of 15 dB. We see that there is one range of angles from approximately 325° to 50° (a continuous range since the angle is periodic, and angles 360° and 0° are the same) corresponding to candidate angles when cell 1 is the strongest reported, and one range of angles from 190° to 275° corresponding to candidate angles when cell 3 is the strongest reported.

Figure 10:
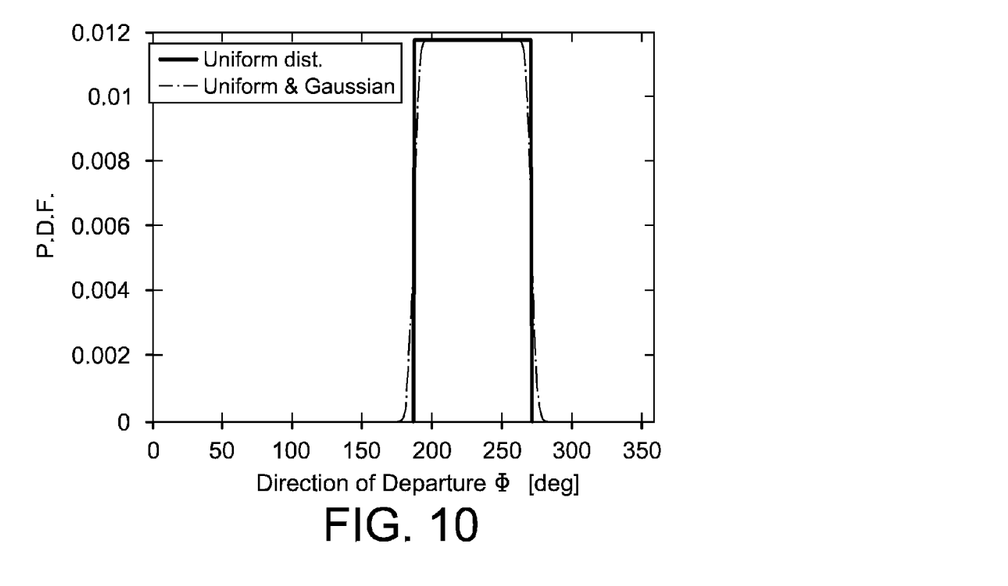
FIG. 10 shows a probability distribution of one band from FIG. 9.

Adhering to this range in one example, the distribution (probability distribution function, "P.D.F.") is uniform within the range where the UE is limited, an example of which is shown in FIG. 10 (indicated as "Uniform Distribution") for the case when cell 3 is the cell which provides the UE with the strongest signal and the UE is limited.

In another example within the same range, a degree of uncertainty is considered by convolving a uniform distribution corresponding to the range within which the UE is limited with a distribution corresponding to uncertainty. This is exemplified in FIG. 10 where the uniform distribution is convolved with a zeros-mean, 10 degrees standard deviation Gaussian distribution, which is shown in FIG. 10 as "Uniform & Gaussian".

Determining the Reliability of Measurement Reports

In some embodiments, the reliability of a UE's measurement reports of a cell's signal strength is evaluated and measurement reports which are determined to be unreliable are discarded. Determining of whether or not the UE was limited as well as the determining of candidates for the angle α is only carried out for reliable measurement reports. Thus, in such embodiments, with reference to the flow chart of FIG. 2, evaluating the reliability of a UE's measurement reports is suitably carried out as an intermediate step after step 220 and prior to continuing with steps 225 or 230.

The reliability of the measurement report for each measured cell's signal strength is evaluated based on the reported received signal strength and received signal quality measurements from the UE. For example, only measurement reports which are associated with a reported received signal quality above a pre-determined threshold are considered to be reliable. This can also be done in those embodiments in which the UE's measurement reports comprise a quality indicator, for example, the so called CQI, along with the reported signal strength.

Measurement reports from non-serving cells may in some embodiments be considered unreliable if the serving cell dominates the received signals at the UE. Determining that the serving cell is dominant can be done by analyzing the reported RSRP and RSRQ. Serving cell RSRQ indicates the fraction of the total received signal power at the UE that is due to the serving cell. If serving cell RSRQ exceeds a threshold, then the serving cell is considered dominant, and the measurement reports of signal strength from other cells are considered unreliable. Alternatively, the RSRQ per reported cell is analyzed, and only measurement reports from cells with RSRQs above a certain threshold are considered reliable. Alternatively, the RSRP per reported cell is analyzed, and only measurement reports from cells with RSRPs above a certain threshold are considered reliable.

The method which has been described above is, in embodiments, carried out in a base station for two or more cells in the cellular communications system, equipped with at least one antenna per cell, In such embodiments, the base station is arranged to receive the measurement reports straight from the UE.

The term "base station" is here used as a generic term for a node which has different names in different cellular communications systems; for example, in GERAN systems the node here referred to as a base station node is known as a Base Transceiver Station, BTS, in UTRAN systems it is known as a NodeB and in E-UTRAN systems (LTE) it is known as an eNodeB.

However, the method need not be carried out in a base station. In embodiments, the method is carried out in a core network node or a radio access network node or an Operations and Maintenance (OaM) system node. An example of an OaM system node is a Trace Collection Entity gathering mobile station trajectory data. The network node is in such embodiments arranged to receive the UE's measurement reports via at least one other node in the cellular communication system. Further examples of the network node include:
- a Radio Network Controller,
- a Base Station Controller,
- a Serving Mobile Location Center,
- an Evolved Serving Mobile Location Center.

A Radio Network Controller is a node which can be found in, for example, WCDMA systems, while the Base Station Controller is usually found in GSM systems. A Serving Mobile Location Center is a node which is usually found in GSM systems, WCDMA systems and 3G systems, while the Evolved Serving Mobile Location Center is a node which is usually found in LTE systems.

Figure 11:
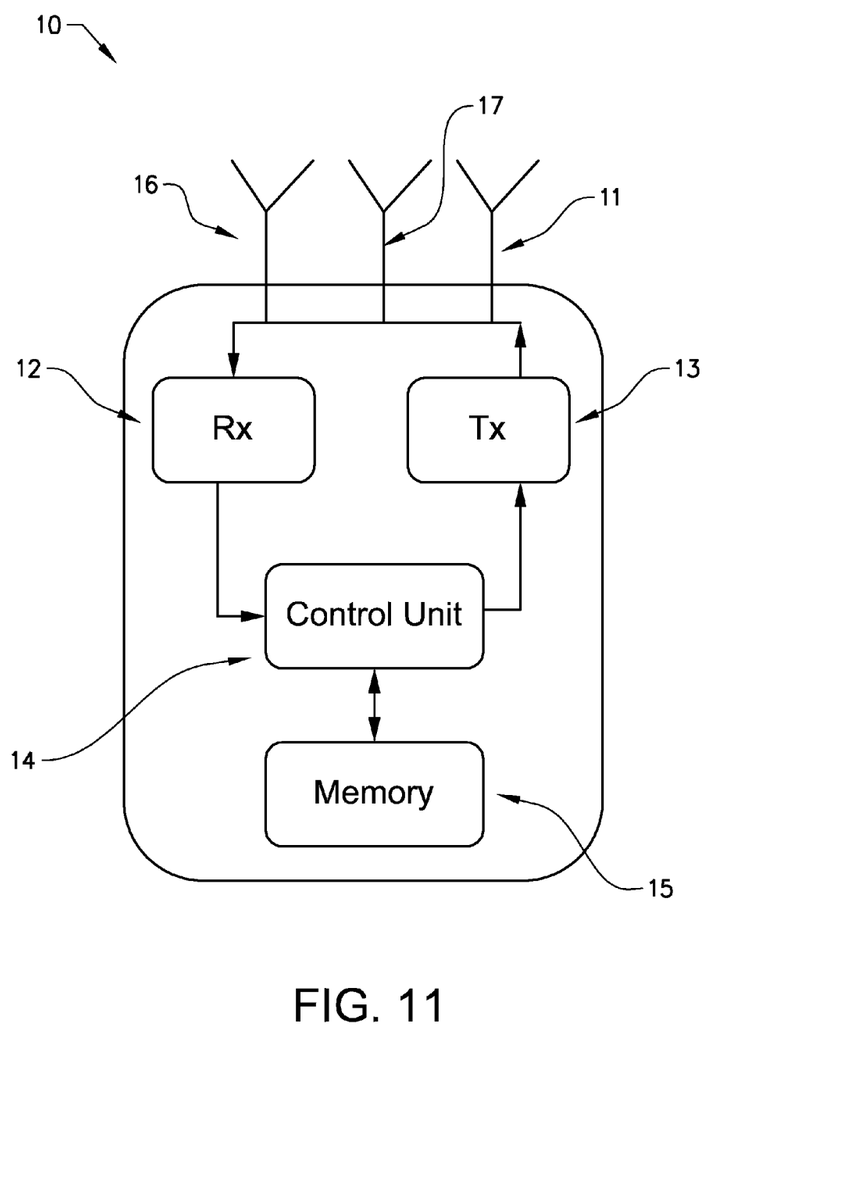
FIG. 11 shows a block diagram of a network node, in this case a base station.

The invention also discloses a network node, one embodiment of which is shown in FIG. 11. In this embodiment, the network node is a base station 10 for two or more cells in a cellular system, such as the cells 111, 112 and 113 in the system 100 of FIG. 1. In the embodiment as base station, the network node receives measurement reports straight from the UE, but the network node can also be implemented as another node in the cellular communications system. In such cases, the network node receives measurement reports from the UE via one or more other network nodes, including the base station.

The network node 10 is equipped with at least one antenna per cell that it is intended to serve, so that FIG. 11 shows three antennas, one for each of the cells 111, 112 and 113, although naturally, there may be more than one antenna per cell.

As indicated in FIG. 11, the network node 10 is equipped with a receiver unit Rx 12, a transmitter unit Tx 13, as well as a control unit 14 and a memory unit 15. The control unit is used to control the overall function of the controlling node 10, as well as the function of the receiver unit 12 and the transmitter unit 13. The memory unit is suitably used to store operational parameters, such as, for example, the first and/or second thresholds mentioned previously, i.e. with information on the UE's limitations on measuring said signal strength, as well as the antenna diagrams for the antennas 11, 16 and 17.

By means of the antennas 11, 16 and 17 and the receiver unit 12 as well as the control unit 14, the network node 10 receives measurement reports from at least one User Equipment, a UE, such as the UE 105 in FIG. 1, where the measurement reports include the strength of signals received in the UE from two or more of the cells which are served by the network node 10.

By means of the control unit 14 together with the memory unit 15, the controlling node carries out the following for at least one pair of cells which are served by the controlling node:
- Determines whether or not the UE was limited with respect to its measurements of the strength of the signals from one of the cells in the pair,
- If the UE was limited, determines statistics for the Direction of Departure using the difference between the signal strengths from the cells in the pair, differences in the cells' antenna gain towards the UE and the maximum difference between the signal strengths from the cells in the pair,
- If the UE was not limited, determines statistics for the Direction of Departure statistics using the difference between the signal strengths from the cells in the pair and said differences in the cells' antenna gain towards the UE.

In various embodiments, the network node determines the statistics for the Direction of Departure by means of one or more of the following:
- If the UE was not limited, determine one or more candidates for the Direction of Departure and a probability distribution function for said one or more candidates,
- If the UE was not limited, determine one or more candidates for the Direction of Departure and a measures of the estimation accuracy for said one or more candidates, said measure being an estimation error variance or standard deviation,
- If the UE was limited, determine a range within which the Direction of Departure is located,
- If the UE was limited or not, associate all of said one or more candidates for the Direction of Departure with a minimum probability.

In embodiments, the network node 10 uses the control unit 14 and the memory unit 15 in order to determine that a (reporting) UE is limited if the difference between the signal strengths from the cells in the pair exceeds a first threshold.

In embodiments, the network node 10 uses the control unit 14 and the memory unit 15 in order to determine that a (reporting) UE is limited if the difference between the signal strengths from the cells in the pair exceeds a second threshold which is larger than the first threshold.

In embodiments, the network node 10 uses the control unit 14 and the memory unit 15 in order to evaluate the reliability of the (reporting) UE's measurement reports, to discard measurement reports which are determined to be unreliable, as well as to only use reliable measurement reports when determining whether or not the UE was limited as well as to determine statistics for the Direction of Departure.

In embodiments, the network node 10 uses the control unit 14 and the memory unit 15 in order to use a quality indicator which is comprised in the measurement reports from the UE, and to consider a measurement report unreliable if its quality indicator is below a pre-determined threshold.

In embodiments, the quality indicator is based on a received signal quality measurement.

In embodiments, the network node 10 uses the control unit 14 and the memory unit 15 in order to consider a measurement report unreliable if the measurement report is from a cell other than the UE's serving cell and the serving cell's RSRQ, Reference Signal Received Quality, exceeds a pre-determined threshold.

In embodiments, the network node 10 uses the control unit 14 and the memory unit 15 in order to use the first threshold, and to use the difference between the strongest signal in the cell pair and the first threshold as the maximum received signal difference for a UE which was limited.

In embodiments, the network node 10 uses the control unit 14 and the memory unit 15 in order to use the second threshold, and to use the strongest signal in the cell pair as the maximum received signal difference for a UE which was limited.

In embodiments, the network node 10 uses the control unit 14 and the memory unit 15 in order to use both the first and second thresholds, and to use as the maximum received signal difference, for a UE which was limited, the difference between the strongest signal in the cell pair and said first threshold if the difference exceeds the first but not the second threshold, and the strongest signal in the cell pair if the difference exceeds the second threshold.

As mentioned, other nodes than a base station can also be used as the network node of the invention, and in such embodiments, the network node receives measurement reports from the UE via one or more other network nodes, including the base station.

Examples of other nodes which can be used as the network node of the invention include a core network node or a radio access network node or an Operations and Maintenance (OaM) system node. An example of an OaM system node is a Trace Collection Entity gathering mobile station trajectory data. The network node is in such embodiments arranged to receive the UE's measurement reports via at least one other node in the cellular communication system. Further examples of the network node include:

a radio network controller,
a base station controller,
a Serving Mobile Location Center,
an Evolved Serving Mobile Location Center.

A Radio Network Controller is a node which can be found in, for example, WCDMA systems, while the Base Station Controller is usually found in GSM systems. Serving Mobile Location Center is a node which is usually found in GSM systems, WCDMA systems and 3G systems, while the Evolved Serving Mobile Location Center is a node which is usually found in LTE systems.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

The invention is not limited to the examples of embodiments described above and shown in the drawings, but may be freely varied within the scope of the appended claims.

The invention claimed is:

1. A method for determining statistics for the Direction of Departure between a User Equipment (UE) in a cellular system and a site for a base station which serves two or more cells in the cellular system and which is equipped with at least one antenna per served cell, the method comprising receiving in the base station measurement reports from the UE which include the strength of signals received in the UE from one or more of the cells which are served by the base station, and for at least one pair of cells served by the base station:

determining whether or not the UE was limited with respect to its measurements of the strength of the signals from one of the cells in the pair;

if the UE was limited, determining said statistics using the signal strengths from the cells in the pair, the antenna gains of the cells towards the UE and the maximum difference between the signal strengths from the cells in the pair; and if the UE was not limited, determining said statistics using the signal strengths from the cells in the pair and differences in the antenna gains of the cells towards the UE.

2. The method of claim 1, according to which the determining of said statistics comprises one or more of the following:

if the UE was not limited, determining one or more candidates for the Direction of Departure and a probability distribution function for said one or more candidates;

if the UE was not limited, determining one or more candidates for the Direction of Departure and a measure of the estimation accuracy for said one or more candidates, said measure being an estimation error variance or standard deviation;

if the UE was limited, determining a range within which the Direction of Departure is located; and if the UE was limited or not, associating all of said one or more candidates for the Direction of Departure with a minimum probability.

3. The method of claim 1, according to which the UE is determined to be limited if the difference between the signal strengths from the cells in the pair exceeds a first threshold.

4. The method of claim 3, according to which the UE is determined to be limited if the difference between the signal strengths from the cells in the pair exceeds a second threshold which is larger than the first threshold.

5. The method of claim 4, according to which said second threshold is used, and the maximum received signal difference for a UE which was limited is seen as the strongest signal in the cell pair.

6. The method of claim 4, according to which both said first and second thresholds are used, and the maximum received signal difference for a UE which was limited is seen as the difference between the strongest signal in the pair and said first threshold if the difference exceeds the first but not the second threshold.

7. The method of any of claim 4, according to which at least said second threshold is used, and only the strongest cell in the pair is reported, and the candidates for said angle are determined from the angles that corresponds to antenna gain differences between the cells in the pair that exceeds the second threshold.

8. The method of claim 3, according to which said first threshold is used, and the maximum received signal difference for a UE which was limited is seen as the difference between the strongest signal in the cell pair and said first threshold.

9. The method of claim 1, according to which the reliability of the measurement reports by the UE is evaluated, and measurement reports which are determined to be unreliable are discarded, and the determining of whether or not the UE was limited as well as the determining of said statistics are only carried out for reliable measurement reports.

10. A network node for a cellular communications system, the network node being arranged to receive measurement reports from a User Equipment (UE) in the cellular communications system, said measurement reports comprising the strength of signals received by the UE from one or more cells served by the same base station, the network node being provided with antenna gain information for said cells and with information on limitations on the UE in measuring said signal strength, the network node being arranged to, for at least one pair of cells served by the base station:
- determine whether or not the UE was limited with respect to its measurements of the strength of the signals from one of the cells in the pair;
- if the UE was limited, determine statistics for the Direction of Departure between the UE and the base station using the signal strengths from the cells in the pair, the antenna gains of the cells towards the UE and the maximum difference between the signal strengths from the cells in the pair; and
- if the UE was not limited, determining statistics for the Direction of Departure between the UE and the base station using the signal strengths from the cells in the pair and said differences in the antenna gains of the cells towards the UE.

11. The network node of claim 10, being arranged to determine said statistics by means of one or more of the following:
- if the UE was not limited, determine one or more candidates for the Direction of Departure and a probability distribution function for said one or more candidates;
- if the UE was not limited, determine one or more candidates for the Direction of Departure and a measures of the estimation accuracy for said one or more candidates, said measure being an estimation error variance or standard deviation;
- if the UE was limited, determine a range within which the Direction of Departure is located; and
- if the UE was limited or not, associate all of said one or more candidates for the Direction of Departure with a minimum probability.

12. The network node of claim 10, being arranged to determine that the UE was limited if the difference between the signal strengths from the cells in the pair exceeds a first threshold.

13. The network node of claim 12, being arranged to determine that the UE was limited if the difference between the signal strengths from the cells in the pair exceeds a second threshold which is larger than the first threshold.

14. The network node of claim 13, being arranged to use said second threshold, and to use the strongest signal in the pair as the maximum received signal difference for a UE which was limited.

15. The network node of claim 13, being arranged to use both said first and second thresholds, and to use as the maximum received signal difference, for a UE which was limited, the difference between the strongest signal in the cell pair and said first threshold if the difference exceeds the first but not the second threshold, and the strongest signal in the cell pair if the difference exceeds the second threshold.

16. The network node of claim 12, being arranged to use said first threshold, and to use the difference between the strongest signal in the cell pair and said first threshold as the maximum received signal difference for a UE which was limited.

17. The network node of claim 10, being arranged to evaluate the reliability of measurement reports by the UE and to discard measurement reports which are determined to be unreliable and to only use reliable measurement reports when determining said statistics.

18. The network node of claim 17, being arranged to use a quality indicator which is comprised in the measurement reports, and to consider a measurement report unreliable if its quality indicator is below a pre-determined threshold.

19. The network node of claim 17, being arranged to consider a measurement report unreliable if the measurement report is from a cell other than the serving cell of the UE and a Reference Signal Received Quality (RSRQ) of the serving cell exceeds a pre-determined threshold.

20. The network node of claim 10, being a base station for two or more cells in the cellular communications system, and being equipped with at least one antenna per cell, the network node being arranged to receive said measurement reports straight from the UE.

21. The network node of claim 10, being arranged to receive the measurement reports by the UE via at least one other node in the cellular communication system, and said network node being one of the following: a radio network controller, a base station controller, a Serving Mobile Location Center, an Evolved Serving Mobile Location Center, or an Operations and Maintenance system node.

* * * * *